(12) United States Patent
Murphy et al.

(10) Patent No.: US 6,627,084 B2
(45) Date of Patent: Sep. 30, 2003

(54) ORGANOCLAY COMPOSITIONS FOR PURIFYING CONTAMINATED LIQUIDS AND METHODS FOR MAKING AND USING THEM

(75) Inventors: Christopher B. Murphy, Clarendon Hills, IL (US); Jonathan M. Fabri, Charleston, SC (US); Robert P. Mahoney, Newbury, MA (US)

(73) Assignee: Polymer Ventures, Inc., Charleston, SC (US)

( * ) Notice: Subject to any disclaimer, the term of this patent is extended or adjusted under 35 U.S.C. 154(b) by 52 days.

(21) Appl. No.: 09/840,959

(22) Filed: Apr. 24, 2001

(65) Prior Publication Data

US 2003/0015473 A1 Jan. 23, 2003

(51) Int. Cl.$^7$ ................................................ B01J 21/16
(52) U.S. Cl. ...................... 210/691; 210/690; 502/61; 502/64; 502/80; 502/401; 502/407
(58) Field of Search ..................... 502/60, 61, 64, 502/80, 85, 401, 407; 210/690, 691

(56) References Cited

U.S. PATENT DOCUMENTS

| | | | | |
|---|---|---|---|---|
| 2,367,384 A | | 1/1945 | Tymstra et al. | 210/1 |
| 2,531,427 A | | 11/1950 | Hauser | 260/448 |
| 2,966,506 A | | 12/1960 | Jordan | 260/448 |
| 2,971,922 A | | 2/1961 | Clem | 252/316 |
| 3,024,164 A | | 3/1962 | Sawyer | 167/42 |
| 3,080,214 A | | 3/1963 | Duke et al. | 23/110 |
| 3,298,849 A | | 1/1967 | Dohman et al. | 106/288 |
| 3,487,928 A | | 1/1970 | Canevari | 210/40 |
| 3,617,561 A | | 11/1971 | Fanselow | 210/47 |
| 3,901,818 A | | 8/1975 | Durand et al. | 252/184 |
| 4,054,515 A | | 10/1977 | Sawyer, Jr. | 210/27 |
| 4,079,001 A | | 3/1978 | Haase et al. | 210/36 |
| 4,116,825 A | | 9/1978 | Sawyer, Jr. | 210/27 |
| 4,116,826 A | | 9/1978 | Sawyer, Jr. | 210/27 |
| 4,116,827 A | | 9/1978 | Sawyer, Jr. | 210/27 |
| 4,116,828 A | | 9/1978 | Sawyer, Jr. | 210/27 |
| 4,167,481 A | | 9/1979 | Cremers et al. | 210/36 |
| 4,194,915 A | * | 3/1980 | Perkins | 106/38.25 |
| 4,283,587 A | * | 8/1981 | Rosback et al. | 585/828 |
| 4,386,010 A | | 5/1983 | Hildebrandt | 252/428 |
| 4,444,665 A | | 4/1984 | Hildebrandt | 210/660 |
| 4,464,274 A | * | 8/1984 | House | 508/143 |
| 4,473,477 A | | 9/1984 | Beall | 210/691 |
| 4,517,094 A | | 5/1985 | Beall | 210/664 |
| 4,536,485 A | * | 8/1985 | Topp-Jorgensen | 502/62 |
| 4,676,997 A | * | 6/1987 | LaFay et al. | 427/134 |
| 4,769,078 A | | 9/1988 | Tso | 106/287.25 |
| 4,781,860 A | | 11/1988 | Doan | 252/628 |
| 4,802,985 A | | 2/1989 | Sugimori et al. | 210/502.1 |
| 4,999,125 A | * | 3/1991 | Goodman | 510/530 |
| 5,028,338 A | | 7/1991 | Hooykaas | 210/679 |
| 5,057,467 A | | 10/1991 | Croft | 501/148 |
| 5,071,587 A | | 12/1991 | Perman | 252/181 |
| RE34,041 E | | 8/1992 | Doan | 252/628 |
| 5,204,402 A | * | 4/1993 | Foster et al. | 524/450 |
| 5,231,063 A | | 7/1993 | Fukumoto et al. | 502/62 |
| 5,238,575 A | | 8/1993 | Waldmann | 210/680 |
| 5,283,235 A | * | 2/1994 | Bush et al. | 507/118 |
| 5,320,773 A | | 6/1994 | Perman et al. | 252/181 |
| 5,407,879 A | | 4/1995 | Kajita | 502/62 |
| 5,454,955 A | | 10/1995 | Albrecht et al. | 210/705 |
| 5,554,288 A | | 9/1996 | Rydell et al. | 210/504 |
| 5,556,547 A | | 9/1996 | Kajita | 210/751 |
| 5,667,694 A | | 9/1997 | Cody et al. | 210/679 |
| 5,670,435 A | | 9/1997 | Kajita | 502/81 |
| 6,080,319 A | | 6/2000 | Alther | 210/679 |

FOREIGN PATENT DOCUMENTS

EP        0 221 225     *   5/1987

OTHER PUBLICATIONS

The Industrial Minerals Handybook II by Peter . Harben, Attapulgite & Sepiolite p. 9–11, Bentonite p. 21–25, and Zeolites p. 200–202, published 1995 by Industrial Minerals Division, London.

* cited by examiner

*Primary Examiner*—Tom Dunn
*Assistant Examiner*—Christina Ildebrando
(74) *Attorney, Agent, or Firm*—Nelson, Mullins, Riley & Scarborough, LLP

(57) ABSTRACT

The current invention describes organoclay compositions and methods of using them for removing impurities from contaminated liquids. The compositions are formed by contacting an attapulgite, sepiolite, or zeolite clay mineral with an alkylamine base. The method of use involves contacting the organoclay composition with a contaminated liquid, such as oil in water, allowing the organoclay to absorb the contaminants. The organoclay can be in the form of a granular solid for inline filter applications, or it can be a finely divided powder for other applications.

76 Claims, No Drawings

ORGANOCLAY COMPOSITIONS FOR PURIFYING CONTAMINATED LIQUIDS AND METHODS FOR MAKING AND USING THEM

BACKGROUND OF THE INVENTION (1) Field of the Invention

The present invention relates to organoclay compositions and methods of making them and for using them for removing impurities from contaminated liquids, and more particularly to organoclay compositions formed by contacting a microporous non-swelling aluminosilicate substrate with an alkylamine base.

(2) Description of the Related Art

Contaminated liquids are commonly produced as a result of industrial activities, transportation over land and water and storage and handling. Accidental releases, runoff, and the like are common problems that result in oil contaminated water, which is caused by spilling, leaking, or otherwise contacting the water with crude or refined oils, lubricants, fuels, or exhaust. The contaminants can render the liquid hazardous or unsuitable in terms of potability, industrial exposure, appearance, odor, growth of microorganisms, or environmental release. Methods of treating contaminated liquids are known, including the use of certain clays, treated clays, activated carbon and other materials as absorbents or adsorbents for the contaminants. Some of these materials have a high capacity for removing oils, for example, but may also absorb large amounts of water, or lose their structural integrity. Absorption of an excess amount of water can impair or limit the capacity of the material in removing the target impurities.

The modification and/or use of various types of clays as absorbents for contaminants has generated wide interest. General information on various clays and other aluminosilicates can be found, for example, in *The Industrial Minerals Handybook II*, Peter W. Harben, Ed., pp. 9–11 (attapulgite and sepiolite), pp. 21–25 (bentonite), and pp. 200–202 (zeolites), Industrial Minerals Division, Metal Bulletin PLC, London (1995).

In U.S. Pat. No. 2,367,384, Tymstra et al. described the use of a broad range of hydrophobic organic materials as coatings for a variety of fine particulate solids in order to obtain compositions capable of absorbing oil from water. Hauser, in U.S. Pat. No. 2,531,427, described the production of a swelling clay product that has been treated with an organic "onium" compound to form a material that formed a swollen gel upon contact with organic liquids.

Jordan, in U.S. Pat. No. 2,966,506, described the formation of modified clay complexes by reacting a swelling bentonitic clay, which had been ion exchanged, with an organic ammonium salt. The complexes were said to be useful for gelling an organic liquid.

U.S. Pat. No. 2,971,922 taught organophilic mineral compositions consisting of 25–70 parts of a clay and 30–75 parts of a fatty acid amide. These colloidal clay materials were used as gelling agents, foundry binders, and rheology modifiers.

U.S. Pat. No. 3,024,164 described monoethanolamine (MEA) coated clay compositions for use as a pesticide carrier.

U.S. Pat. No. 3,080,214 disclosed the treatment of attapulgite to make a filter aid by forming a dispersion, grinding, and drying the material.

U.S. Pat. No. 3,298,849 disclosed hydrating, swelling clays modified with alkanolamine acid salts.

In U.S. Pat. No. 3,487,928, Canevari taught the use of a montmorillionite clay that had been treated with an organic cationic agent, such as an amine or a glycol, for the removal of dispersed droplets of oil from water.

U.S. Pat. No. 3,617,561 disclosed the use of attapulgite with anionic polyacrylamide as a clarifying agent.

U.S. Pat. No. 3,901,818 disclosed a complex for binding hydrocarbons, comprising a solid hydroxyl-containing substrate, activated with an acid halide, then covalently bound with primary amines.

U.S. Pat. No. 4,054,515 disclosed the absorption of heavy metals from water using attapulgite or sepiolite.

U.S. Pat. No. 4,079,001 disclosed the purification of industrial effluents with an adsorptive material made from a cellulosic carrier treated with a clay-polyamidopolyamine complex.

U.S. Pat. Nos. 4,116,825 through 4,116,828 disclosed the use of attapulgite and sepiolite to adsorb hormones ('825), toxins ('826), viral microorganisms ('827), and pesticides ('828) from water.

U.S. Pat. No. 4,167,481 disclosed a process for metals removal using cation exchangers (tectosilicate and phyllosilicate clays) in the presence of polyamines.

U.S. Pat. No. 4,386,010 disclosed compositions of attapulgite treated with quaternary ammonium or phosphonium surfactants.

U.S. Pat. No. 4,444,665 disclosed a method of purifying aqueous liquids with calcined attapulgite treated with quaternary cationic surfactants.

Beall, In U.S. Pat. No. 4,473,477, described a method for absorbing organic wastes onto an organoclay formed by reacting a quaternary ammonium salt and a smectite-type clay. In U.S. Pat. No. 4,517,094, the same inventor described a two-stage method for removing organic contaminants from aqueous liquids, where the first step of the method involved passing the waste through a column packed with an organoclay.

U.S. Pat. No. 4,769,078 disclosed organophilic clays made by reacting smectic clays with quaternary ammonium compounds and a betaine.

U.S. Pat. Nos. Re. 34,041 and 4,781,860 disclosed a method of disposal of radioactive or hazardous liquid wastes, by adding attapulgite or sepiolite clay and stirring until the mixture solidified.

U.S. Pat. No. 4,802,985 disclosed a water treatment material of organic thermoplastic polymer, inorganic particulate material, and organic cationic crosslinked polymer.

U.S. Pat. No. 5,028,388 taught an immobilizing process for metallic and organic pollutants, by absorbing them on a layered clay mineral modified with a quaternary ammonium compound.

U.S. Pat. No. 5,057,467 described the use of polyalkylenepolyamine and an optional latex to improve the filtration rate and viscosity of clay slurries.

U.S. Pat. No. 5,071,587 disclosed a composition for removing turbidity, metals, and organics from drinking water, comprising clay, coagulant or flocculent, biocide, and activated charcoal.

U.S. Pat. No. 5,231,063 taught a composite adsorbent for odors, comprising salts of aromatic amino acids, an acid, and a transition metal.

U.S. Pat. No. 5,238,575 described a method of absorbing hydrocarbons, using acid leached bentonite modified with an alkyl ammonium salt that is protonated with an organic aliphatic acid. Optional co-additives were also listed.

U.S. Pat. No. 5,320,773 disclosed a method of making a dry solid water purification composition, by impregnating a mineral with a biocide and a coagulant or flocculant.

U.S. Pat. No. 5,407,879 taught a method of absorbing contaminated liquids with smectite clays impregnated with a water soluble polymer.

U.S. Pat. No. 5,454,955 disclosed a method of clarifying deinking waste with hectorite clay, cationic coagulant, and anionic flocculant.

U.S. Pat. No. 5,554,288 described the use of filter papers impregnated with additives to remove halogen, organic, and metal cation wastes.

U.S. Pat. No. 5,556,547 disclosed the use of polymer modified smectite clays to thicken or solidify sludges.

U.S. Pat. No. 5,667,694 disclosed a method of heavy metals removal using an organoclay formed from a smectite clay and a quaternary ammonium salt.

U.S. Pat. No. 5,670,435 disclosed a composition of bentonite with acid for treating waste water.

U.S. Pat. No. 6,080,319 taught a method of removing inorganic ionic contaminants from water using a mineral modified with an organic ionic compound and an amphoteric surfactant.

Despite the advances that have been made in the area of organoclay compositions for treating liquid wastes, there remains a need for economical, effective compositions that can be used in different types of treatment settings. Specifically, for inline treatment settings, a non-swelling composition would be preferable for cartridge containment. It would also be useful if such compositions provided low resistance to liquid flow, and were capable of maintaining structural integrity while demonstrating low water absorption and a high capacity for organics. There is also a need for new methods of purification of contaminated liquids using such solid sorbents.

SUMMARY OF THE INVENTION

Briefly, therefore, the present invention is directed to a novel composition for purifying contaminated liquids, the composition comprising a granular microporous non-swelling aluminosilicate substrate having absorbed thereon a primary, secondary or tertiary alkylamine base.

The present invention is also directed to a novel method of purifying contaminated liquids comprising contacting the contaminated liquid with the composition described above.

The present invention is also directed to a novel method of making a composition for purifying contaminated liquids, the method comprising contacting a granular microporous non-swelling aluminosilicate substrate with a primary, secondary or tertiary alkylamine base so that the alkylamine base is absorbed into the pores of the aluminosilicate substrate.

The present invention is also directed to a novel method of purifying a contaminated liquid comprising contacting the contaminated liquid with an effective amount of a composition comprising a granular microporous non-swelling aluminosilicate substrate having a primary, secondary or tertiary alkylamine base absorbed thereon.

The present invention is also directed to a novel method for removing organic impurities from water comprising contacting the water with an effective amount of a composition that is produced by contacting a granular microporous non-swelling aluminosilicate substrate with a primary, secondary or tertiary alkylamine base so that the alkylamine base is absorbed into the pores of the aluminosilicate substrate.

Among the several advantages found to be achieved by the present invention, therefore, may be noted the provision of an economical, effective organoclay composition for treating liquid wastes that can be used in different types of treatment settings, the provision of a non-swelling composition suitable for cartridge containment, the provision of a composition that provided low resistance to liquid flow, and is capable of maintaining structural integrity while demonstrating low water absorption and a high capacity for organics, and the provision of new methods of purification of contaminated liquids using such solid sorbent composition.

DETAILED DESCRIPTION OF THE PREFERRED EMBODIMENTS

In accordance with the present invention, it has been discovered that a novel and effective composition for purifying contaminated liquids can be formed by combining a granular microporous non-swelling aluminosilicate substrate with a primary, secondary or tertiary alkylamine base. The subject composition also can be generally referred to herein as an "organoclay". The novel organoclay compositions can be formed by contacting attapulgite or sepiolite with an alkylamine base, and these organoclay compositions have been found to be useful in purifying contaminated liquids.

In general terms, the present organoclays are formed by contacting certain types of aluminosilicate substrate materials (such as certain clays) with an alkylamine base. The main components of the novel composition can exist as a blend by nature of physical entrapment, adsorption, absorption, coating, and the like, or alternatively could be bonded by covalent, ionic, hydrogen bonding, hydrophobic association chelation, or other means. The subject organoclay compositions are more hydrophobic than their unmodified starting minerals by nature of the incorporation of the alkylamine base modifier. The organoclay compositions of the invention are also generally characterized by a higher capacity for absorbing hydrocarbons in the presence of water, as compared with the unmodified clay minerals.

The quaternary amine modified clays of the prior art are generally less hydrophobic than the organoclay compositions of this invention and as a result they have a inferior capacity for absorbing hydrocarbons in the presence of water. This reduced capacity for absorbing hydrocarbons could be a result of water absorption into the quaternary amine modified clays. A further disadvantage of the quaternary amine modified clays is the reduced mechanical strength of the particles relative to the granular particles of the present compositions. Higher mechanical strength of the particles is desirable in applications such as purification of contaminated water streams, where the water has a tendency to soften and swell clay particles and cause breakage and clogging of equipment.

The subject organoclay compositions also can be made without the use of an acid halide as has been practiced in the prior art. The acid halide materials are hazardous and represent additional processing steps to achieve covalent binding of the modifier to the clay. Surprisingly, we have found that the present organoclays do not require activating reagents or covalent binding of the alkylamine base to the aluminosilicate mineral substrate.

The aluminosilicate substrate that is used to make the subject compositions are microporous aluminosilicate minerals selected from the group consisting of attapulgite, sepiolite, palygorskite, Fuller's earth, zeolite, and hormite. As used herein, the alumninosilicate substrate alternatively may be referred to as a "clay". An idealized formula representing attapulgite is $(OH_2)_4(OH)_2Mg_5Si_8O_{20}\text{-}4H_2O$ and sepiolite is represented by $Si_{12}Mg_9O_{30}(OH)_6(OH_2)_4\text{-}6H_2O$, but natural variations occur in the mineral deposits. Attapulgite and sepiolite are clays of the hormite group, and palygorskite and Fuller's earth are synonyms for attapulgite. Based on this, any member of the hormite, attapulgite, Fuller's earth, sepiolite, or palygorskite mineral classifications that meets the criteria for the aluminosilicate substrate that are described herein can be used as the aluminosilicate substrate of the invention.

In another embodiment, a zeolite can be used as the aluminosilicate substrate of the invention. Zeolites are well known, from either synthetic or natural origin, and are characterized as crystalline microporous hydrated aluminosilicates having pores in the size range of 3–10 angstroms.

Attapulgite and sepiolite have a porous nature due to the needle-shaped crystal structure (which can also be described as "chain type" crystal structure). When an aluminosilicate substrate material of the present invention is described as being "microporous", it is meant that the material has a Brunauer, Emmett, Teller (BET) surface area of at least about 100 $m^2/g$ and an average pore size of under about 10 angstroms. It is preferred that the substrate has a BET surface area of about 150–300 $m^2/g$. The pores in the preferred attapulgite and sepiolite minerals have an average size of about 6 angstroms.

The inventors have found that it is preferred that the aluminosilicate substrate be microporous. This porosity provides an effective surface area greater than that of an equivalent particle size distribution of non-porous material, such as sand, glass dust, and the like. The combination of microporosity with a particle having a granular size has been found to be particularly advantageous.

The microporous aluminosilicates of the present invention are characterized by a void volume of 10% to 70%, and preferably from about 30% to about 50%. The void volume can be defined as the volume percent capacity of the dried substrate to absorb a liquid without significant swelling. For example, a quantity of LVM attapulgite was found to absorb 50% of its volume in water without swelling more than 10%. When it is said that the present aluminosilicate substrates are non-swelling, it is meant that they exhibit swelling upon absorption of less than 20% by volume. It is preferred that the aluminosilicates swell less than 10% by volume.

The density of the porous aluminoslicate substrate is also an indicator of the extent of porosity. If completely non-porous, the density of a dried aluminosilicate would be in excess of 2,500 $kg/m^3$. The dried aluminosilicates having a bulk density of 320 to about 2,400 $kg/m^3$ are characterized as porous. It is preferred that the bulk density of the dried aluminosilicate substrates is from about 320 to about 1,000 $kg/m^3$.

While the properties of the aluminosilicate that are described above are preferred to make the organoclay composition of the invention, it should be understood that the aluminosilicate might become somewhat less porous and more dense upon modification with the alkylamine base of the invention, and that the void volume would be decreased accordingly. The presence of moisture or solvents in the aluminosilicate would also have a similar effect.

When the aluminosilicate substrates are in hydrated form, the pores are filled with water molecules or hydrated cations that may be driven off by heating to 500° C. to produce a low volatile material (LVM) clay. Clays dried at 200° C. are referred to as regular volatile material (RVM) clays. While the organoclay compositions of the current invention may be prepared from hydrated, dried, calcined, LVM, or RVM clays, the preferred form is an RVM clay, and LVM clay is even more preferred.

Clays that are suitable for use in the present invention are preferably derived from a naturally occurring mineral source, but synthetic clays are expected to be effective as well. The clay is preferably provided in the form of a granular solid having a high surface area, but a finely divided clay, an agglomerated clay, or even a slurry of clay particles in a liquid would be sufficient. The preferred granular solid differs from support materials of the prior art in that in many known materials, large surface area was obtained by the provision of very fine particles, such as fines, silt, dust and sand. By way of comparison, the inventors have found that a preferred particle size is granular, as described below, which allows for higher flow rates or a lower back pressure of liquid passing through a column, layer, or bed of the composition. This makes the present composition more suitable for commercial applications and continuous flow applications. Moreover, it is believed that handling of finely divided solids can have harmful effects upon humans, so that the present granular materials would also be safer than the very fine materials.

The aluminosilicate substrate and the organoclay composition of the present invention are granular materials, rather than fine materials. A majority of the particles of the substrate and the organoclay, by weight, are within the range of from about 0.25 mm to about 10 mm in diameter, and preferably from about 1 mm to about 3 mm. The particle size of the aluminosilicate substrate can be characterized by retention on a standard mesh screen. When it is said that an aluminosilicate substrate is "granular", it is meant that the material is composed of particles having a size range where 20%–100% by weight are retained on a #60 mesh screen and not over 20% by weight of the particles are over 4 mm. A preferred clay is characterized by 80%–100% by weight retention on a #60 mesh screen, more preferred is a clay characterized by 95%–100% by weight retention on a #60 mesh screen. Another preferred aluminosilicate substrate is one having particles characterized by retention of at least 50% by weight on a #30 mesh screen and not over 20% by weight of the particles are over about 2 mm.

Preferred aluminosilicate substrates are attapulgite, sepiolite, and zeolite. In particular, it is preferred that the aluminosilicate substrate contain at least 80% by weight of one of these materials. It is anticipated that substitution of another non-swelling, porous, aluminosilicate material having high surface area could be substituted for the preferred aluminosilicate substrates without departing from the scope of the invention. When the an aluminosilicate substrate is defined herein as a certain class of mineral, it is understood for the purposes of this invention that the clay is predominantly composed of that mineral, but it would be expected that other minerals might also be present in minor amounts.

In a preferred embodiment, the clays of the invention are non-swelling clays, such that the volume of the clay particles does not increase significantly upon contact with liquids. The non-swelling clays typically have better physical integrity in an aqueous environment that swelling clays, such as bentonite (montmorillionite). Non-swelling clays have a higher particle hardness and better crush strength in the presence of water, resulting in better maintenance of the desired granular form of the particles.

The alkylamine base of the invention is characterized as a material that is selected from the group consisting of primary, secondary, and tertiary alkylamines. In a preferred embodiment, the alkylamine base has the chemical structure $R^1R^2R^3N$ where at least one of the R groups is an alkyl group containing 6–30 carbon atoms and the other R groups can represent hydrogen atoms. It is more preferred that the alkyl group have from about 10 to 30 carbons and even more preferred that is has about 12 to 30 carbons. Alternatively, a preferred alkyl group is one that has at least about 12 carbons, or more. The preferred alkylamine base is characterized as being nonionic. It is also preferred that the alkyamine base is nonamphoteric. It is believed that incorporation of ionic functional groups onto the subject alkylamines would decrease the hydrophobicity of the resulting organoclay composition, thereby reducing a desirable property of the composition.

A preferred alkylamine base is a fatty alkylamine and more preferably the alkylamine base is a primary fatty alkylamine. A preferred alkylamine base is insoluble in water, and has not been chemically modified prior to contacting it with the aluminosilicate substrate.

Alkylamine bases that are useful in the present invention are oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octadecyldimethylamine, dihydrogenated tallowalkylmethylamine, dioctadecylamine, and the like.

If desired, the alkylamine can be dissolved or dispersed in a solvent to provide adequate coverage of the clay mineral. For the purposes of this invention, the solvent is considered to be any liquid in which the alkylamine base can be dissolved or dispersed. In one embodiment, the alkylamine is dispersed in the solvent in the form of a heterogeneous emulsion or dispersion. In a preferred embodiment, the alkylamine is dissolved in a solvent to form a true homogeneous solution.

The solvent is typically selected from the group consisting of water, alcohols, halogenated solvents, glycols, ethers and combinations thereof. Useful solvents are isopropanol, water, dichloromethane, ethylene chloride and n-propylbromide.

When a solvent is used in the novel method, the solvent is used as a carrier to aid in contacting the alkylamine base with the clay mineral. After the contacting step, the solvent can be removed. It is preferred that the solvent is removed by evaporation or distillation. To facilitate removal of the solvent, a low-boiling solvent is preferred, with a boiling point of 120° C. or lower at 760 mm Hg pressure. In another embodiment, the solvent is removed at a reduced pressure relative to the ambient atmospheric condition.

In one embodiment, the solvent is removed until a residual content of less than 10% by weight of the organoclay remains. Preferably, the residual solvent content of the organoclay is less than 3%, and most preferably the residual solvent content is less than 1%.

Solubilizing agents can be added with the solvents to assist the function of dispersing or dissolving the alkylamine modifier. The solubilizing agents can be selected from surfactants, coupling agents, and cosolvents.

Methods of preparation of the subject composition include providing a vessel to contact the aluminosilicate substrate with the alkylamine base. Such vessels can include stirred vessels, rotating vessels, static vessels, ovens, kilns, dryers, and cartridges. The alkylamine base can be applied as a neat liquid or preferably as a solution, with the use of spray nozzles or bars or other suitable means to deliver a liquid into contact with a solid. Preferably, a means is provided to heat the treated clay to assist in removing the solvent and residual moisture. In one embodiment, the organoclay composition is dried at a temperature between 20 and 250 degrees Celcius. Preferably, the organoclay is dried at a temperature between 40 and 150 degrees Celcius, and most preferably the organoclay is dried at a temperature between 50 and 100 degrees Celcius.

In the case where nonaqueous solvents are used in making the organoclay composition, recycling of the solvent is preferred for economic and environmental reasons. In the embodiment where water is used as the solvent, the drying temperature is preferably between 100 and about 250 degrees Celcius.

It is preferred that the weight ratio of the alkylamine base to aluminosilicate substrate is between 0.01:1 and 2:1, more preferred is a ratio of alkylamine to aluminosilicate is between 0.05:1 and 1:1, and even more preferred is a ratio of alkylamine to aluminosilicate is between 0.1:1 and 0.6:1.

The subject organoclay compositions have been found to be useful in the purification of contaminated liquids. Methods of purification of liquids with a subject organoclay composition include absorption, adsorption, chelation, complexation, and association. In general, the contaminants migrate into the organoclay and the organoclay is then separated from the remaining liquid. This can be accomplished in a flow-through continuous or batchwise process, using a cartridge or other vessel containing the organoclay composition and allowing contact with the contaminated liquid.

For cartridge applications, a granular composition is preferred. The particle size of the organoclay composition can be characterized by retention on a standard mesh screen. Useful aluminosilicate substrates include those that would be 20%–100% by weight retained on a #60 mesh screen. Preferably, the organoclay composition is characterized by 80%–100% retention on a #60 mesh screen, and more preferably, the organoclay composition is characterized by 95%–100% retention on a #60 mesh screen. Another preferred size range of the subject granular composition is that at least about 50% by weight of the material is retained on a #30 mesh screen.

In another embodiment, the absorbent composition is added to the contaminated liquid and the contaminant is substantially absorbed, allowing for removal of the organoclay composition as a solid or slurry. In a further embodiment, a finely divided organoclay is added to the contaminated liquid and separated optionally with assistance from coagulants or flocculants. Alternatively, the organoclay is added and mixed with the contaminated liquid until the mixture solidifies for removal or disposal. In each method, the organoclay provides a means to separate the contaminants from the bulk of the remaining liquid.

The utility of the subject organoclay compositions in purifying contaminated liquids is surprising in that the organoclays are typically hydrophobic in nature. In spite of the hydrophobicity, the organoclays have been found to be effective in treating aqueous systems, including water contaminated with hydrocarbons or metals. The organoclays of the prior art were substantially based on the use of cationic quaternary amine modified clays, which would result in a more hydrophilic composition than those of the current invention.

The contaminated liquids to be treated by the subject compositions include aqueous and nonaqueous systems, salt water, produced water, and systems containing toxic, hazardous, or undesirable materials. Specifically, the liquids can contain contaminants selected from the group consisting of oil, grease, hydrocarbons, pesticides, heavy metals, radioactive waste, colored materials, odor-causing materials, suspended solids, turbidity, haze, paint, solvents, resins, condensate, bilge water, industrial effluent, deinking waste, surfactants, emulsified materials, microorganisms, MTBE, BTEX, BOD, COD, and combinations thereof.

It is believed that the subject organoclay compositions are capable of immobilizing the impurities in the hydrophobic pores, making the resulting mixture of organoclay and contaminants less hazardous than the contaminated liquid. This immobilization of wastes is significant to the classification of the resulting mixture, such that the contaminants might not be leachable and the material could pass a TCLP test. A further benefit of using the subject organoclays to purify contaminated liquids includes minimizing the volume of a waste.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples.

General Procedures

In the examples all percentages are given on a weight basis unless otherwise indicated.

The alkylamine bases were provided in liquid or solid/wax form, and are available from Sigma-Aldrich, Milwaukee, Wis. or from Akzo Nobel.

Attapulgite was provided in the form of a granular solid, and is available from MinTech International, Bloomington, Ind.

Zeolite was provided in the form of granular clinoptiloloite, and is available from US Zeolite Co., Arvada, Colo.

The organic solvents used were of technical grade, used without purification, and are available from Sigma-Aldrich, Milwaukee, Wis. The water was distilled prior to use.

Examples 1–14 show the production of organoclay compositions of the present invention. Examples 15–16 show the production of comparative organoclay compositions of the prior art. Example 17 represents unmodified attapulgite clay for comparison.

Methods of Clay Modification

A. In a suitable container a 1–50% solution by weight of amine in water was blended and heated to 50–90° C., or above the melting point of the amine, with agitation. A nonionic or cationic surfactant can be added to facilitate emulsification of the amine in water. Once the amine was fully melted and blended, it was quickly added with good agitation to the clay, such that a ratio of amine:clay was 0.05:1–1:1. The slurry of water, amine and clay was placed in an oven at 105–110° C. for 24–48 hours with periodic mixing.

B. In a suitable container a 1–50% solution by weight of amine in a solvent such as isopropanol was blended and heated to 30–70° C., or until the amine is dissolved, with agitation. Once the amine was fully melted and blended, it was quickly added with good agitation to the clay, such that a ratio of amine:clay was 0.05:1–1:1. The slurry of solvent, amine and clay was evaporated then placed in an explosion-proof oven at 105–110° C. for 24–48 hours with periodic mixing.

C. The clay modification procedure was also conducted in a heated rotating drum, equipped to rotate axially at a 45° offset from vertical. The amine and water were placed in a rotating drum and heated to 40–90° C. or until the amine was fully melted and blended. A nonionic or cationic surfactant can be added to facilitate emulsification of the amine in water. The clay was then added to the heated amine/water blend. The temperature was increased to 105–110° C., the water was allowed to evaporate, and the clay was allowed to dry.

D. The solvent based clay modification procedure was also conducted in a heated rotating drum. The amine and solvent, typically isopropanol, were placed in a rotating drum and heated to 30–70° C. or until the amine was fully melted and blended. The clay was then added to the heated amine/solvent blend. The temperature was increased to evaporate the solvent, then the clay was allowed to dry at 70–110° C.

EXAMPLE 1

Tallow-1,3-diaminopropane, 10 parts and water, 20 parts were added to a 500 mL beaker. The blend was heated to 60–80° C. and mixed. Next, 90 parts of attapulgite were added and mixed with a spatula until fully wetted. The amine/clay blend was covered and placed in an oven at 70° C. for 12–16 hours. The temperature was raised to 105–110° C. and the amine/clay blend was allowed to dry for 48 hours with periodic mixing.

EXAMPLE 2

Dihydrogenated tallowalkyl-methylamine, 50 parts and water, 100 parts were added to a 500 mL beaker. The blend was heated to 60–80° C. Next, 50 parts of attapulgite were added and mixed with a spatula until the clay was fully wetted. The amine/clay blend was covered and placed in an oven at 70° C. for 12–16 hours. The temperature was then raised to 105–110° C. and the amine/clay blend was allowed to dry for 48 hours.

EXAMPLE 3

Dihydrogenated tallow alkylamine, 30 parts and water, 90 parts were added to a 1000 mL stainless steel (SS) rotating drum. Using external heating, the amine/water blend was heated to 60–80° C. Next, 70 parts of zeolite clay were added to the rotating SS drum. The temperature of the blend was then increased to 105–120° C. and allowed to dry for several hours.

EXAMPLE 4

Dodecylamine, 15 parts and water, 85 parts were added to a 1000 mL SS rotating drum. Using external heating, the amine/water blend was heated to 60–80° C. Next, 85 parts of zeolite clay were added to the rotating SS drum. The temperature of the blend was then increased to 105–120° C. and allowed to dry for several hours.

EXAMPLE 5

Trihexadecylamine, 50 parts and water, 200 parts were added to a 1000 mL SS rotating drum. Using external heating, the amine/water blend was heated to 60–80° C. Next, 50 parts of zeolite clay were added to the rotating SS drum. The temperature of the blend was then increased to 105–120° C. and allowed to dry for several hours.

EXAMPLE 6

Tallow alkylamine, 30 parts and water, 90 parts were added to a 1000 mL SS rotating drum. Using external heating, the amine/water blend was heated to 60–80° C. Next, 70 parts of attapulgite clay were added to the rotating SS drum. The temperature of the blend was then increased to 105–120° C. and allowed to dry for several hours.

EXAMPLE 7

An organoclay was made at a 23/77 amine/clay ratio. Octadecylamine, 15 parts and water, 35 parts were added to a 500 mL beaker. The blend was heated to 80° C. Next, 50 parts of attapulgite were added and mixed until the clay was fully wetted. The amine/clay blend was covered and placed in an oven at 70° C. for 12–16 hours. The temperature was then raised to 105–110° C. and the amine/clay blend was allowed to dry for 48 hours.

EXAMPLE 8

An organoclay was made at a 15/85 amine/clay ratio. Tallow amine, 8.9 parts and water, 50 parts were added to a 500 mL beaker. The blend was heated to 80° C. Next, 50 parts of attapulgite were added and mixed until the clay was fully wetted. The amine/clay blend was covered and placed in an oven at 70° C. for 12–16 hours. The temperature was then raised to 105–110° C. and the amine/clay blend was allowed to dry for 48 hours.

EXAMPLE 9

Dihydrogenated tallow alkylamine, 30 parts and water, 90 parts were added to a 1000 mL stainless steel (SS) rotating drum. Using external heating, the amine/water blend was heated to 60–80° C. Next, 70 parts of attapulgite clay were added to the rotating SS drum. The temperature of the blend was then increased to 105–120° C. and allowed to dry for several hours.

EXAMPLE 10

Dodecylamine, 15 parts and water, 85 parts were added to a 1000 mL SS rotating drum. Using external heating, the amine/water blend was heated to 60–80° C. Next, 85 parts of attapulgite clay were added to the rotating SS drum. The temperature of the blend was then increased to 105–120° C. and allowed to dry for several hours.

EXAMPLE 11

Trihexadecylamine, 50 parts and water, 200 parts were added to a 1000 mL SS rotating drum. Using external heating, the amine/water blend was heated to 60–80° C. Next, 50 parts of attapulgite clay were added to the rotating SS drum. The temperature of the blend was then increased to 105–120° C. and allowed to dry for several hours.

EXAMPLE 12

Dodecylamine, 15 parts and isopropanol, 85 parts were added to a 1000 mL SS rotating drum. The amine/solvent blend was heated to 50° C. Next, 85 parts of attapulgite clay were added to the rotating SS drum. The temperature of the blend was held at 50° C. and the solvent was allowed to evaporate. After the solvent was evaporated, the temperature of the blend was raised to 105–120° C. and allowed to dry for several hours.

EXAMPLE 13

Dodecylamine, 15 parts and isopropanol, 85 parts were added to a 1000 mL round bottom flask with a ground glass joint. Using external heating, the amine/solvent blend was heated to 50° C. Next, 85 parts of attapulgite clay were added to the flask. The mixture was placed on a laboratory-scale rotary evaporator and mixed by rotation. Vacuum was applied to the mixture and the flask was immersed in a water bath heated to 75° C. to remove the solvent by distillation. After solvent collection ceased, the temperature of the water bath was then increased to 90° C. and the modified organoclay was allowed to dry under vacuum for several hours.

EXAMPLE 14

Dodecylamine, 15 parts and methylene chloride, 85 parts were added to a 1000 mL round bottom flask with a ground glass joint. After mixing the amine/solvent blend, 85 parts of attapulgite clay were added to the flask. The mixture was placed on a laboratory-scale rotary evaporator and mixed by rotation. Vacuum was applied to the mixture and the flask was immersed in a water bath at 25° C. to remove the solvent by distillation. After solvent collection ceased, the temperature of the water bath was then increased to 90° C. and the modified organoclay was allowed to dry under vacuum for several hours.

EXAMPLE 15

A quaternized organoclay was made as a comparative example, using attapulgite as the clay and cetyltrimethylammonium chloride as the quaternary amine. Cetyltrimethylammonium chloride, 20 parts and water, 60 parts were added to a 500 mL beaker. The blend was heated to 80° C. Next, 100 parts of attapulgite clay were added and mixed until the clay was fully wetted. The quaternary amine/clay blend was heated to drive off the solvent. The temperature was then raised to 105–110° C. and the amine/clay blend was allowed to dry for 24 hours.

EXAMPLE 16

A fatty amide modified organoclay was made as a comparative example, using attapulgite as the clay and octadecylamide as the fatty amide. Octadecylamide, 20 parts and isopropanol, 66 parts were added to a 500 mL beaker. The blend was heated to 40° C. Next, 100 parts of attapulgite clay were added and mixed until the clay was fully wetted. The fatty amide/clay blend was heated to drive off the solvent. The temperature was then raised to 105–110° C. and the amine/clay blend was allowed to dry for 24 hours.

EXAMPLE 17

Unmodified attapulgite was used as received for comparison with the modified minerals.

Results

Water Repellency Test

A drop of water was placed on a layer of modified organoclay particles and allowed to sit for hours and the droplet size and duration of integrity was examined. Table I outlines the results.

TABLE I

| Example # | Water Repellency |
|---|---|
| 1 | 7 hours |
| 2 | >10 hours |
| 3 | 8 hours |
| 4 | 4 hours |
| 5 | >10 hours |
| 6 | >10 hours |
| 7 | >10 hours |
| 8 | >10 hours |
| 13 | 5 hours |
| 15 | <30 minutes |
| 16 | <30 minutes |
| 17 | <1 minute |

The water repellency gives a general indication of the hydrophobic characteristics of the organoclay. All of the organoclays of Examples 1–8 and 13 showed good water repellency over an extended period of time. By comparison, the unmodified clays were found to absorb a water drop in less than one minute (Example 17). This shows that the modification of the clay imparts a hydrophobic surface. The modified organoclays of the prior art were prepared in Examples 15 and 16. A quaternary amine modified clay (Example 15) and a fatty amide modified clay (Example 16) had poor water repellency compared to the organoclays of the current invention.

Oil Absorbency Test

In this test, the organoclays are compared to determine their ability to absorb oil in the presence of water. To a 1000 mL beaker, 500 mL of water was added. The water was then mixed with an overhead stirrer, and ten grams of modified organoclay was added and allowed to disperse. Next a known weight, in grams, of crude oil was dispersed in the water and the dispersion was allowed to mix 5 minutes. The mixer was stopped and no free oil/film was seen floating under the conditions listed as shown below. Since all of the oil was absorbed by the organoclay, the oil absorption can be calculated as grams of oil per gram of organoclay. The test is repeated with different levels of oil added until the maximum oil absorption is determined, with no oil film visible on the water surface.

TABLE II

| Example # | Crude Oil added (g) | Water surface | Oil Absorption (g/g) |
|---|---|---|---|
| 1 | 2.4 | Clear - no oil film | 0.24 |
| 2 | 3.7 | Clear - no oil film | 0.37 |
| 3 | 2.4 | Clear - no oil film | 0.24 |
| 4 | 2.8 | Clear - no oil film | 0.28 |
| 5 | 3.6 | Clear - no oil film | 0.36 |
| 6 | 4.5 | Clear - no oil film | 0.45 |
| 7 | 3.8 | Clear - no oil film | 0.38 |
| 8 | 4.0 | Clear - no oil film | 0.40 |
| 15 | 1.0 | Clear - no oil film | 0.10 |
| 16 | 2.0 | Clear - no oil film | 0.20 |
| 17 | <0.5 | Oily | <0.05 |

The results of the absorbency tests in Table II show that the organoclays of Examples 1–8 can absorb 24–45% of their weight in oil. The comparative Examples 15 and 16 had inferior oil loading capacities (10–20%), while the unmodified attapulgite (Example 17) had the worst performance (<5%) of those tested. The most preferable result in this test is to absorb a high level of crude oil (>20%) while leaving no oil film on the surface of the water.

Comparison of the oil absorption capacities of the subject compositions with the capacities reported by Tymstra et al. in U.S. Pat. No. 2,367,384, indicate that the present compositions have substantially higher absorbance capacities than the coated sand particles the Tymstra et al. patent. Tymstra et al. reported the requirement of from 4.8 to 7.0 g of its coated sand to sink 1 g of gasoline, compared with the absorption of 1 g of hydrocarbons with only 2.2 to 4.2 g of the subject composition. It is believed that one reason for this improvement is the use of a non-swelling, granular microporous substrate in the present case, rather than the relatively non-porous materials as reported by Tymstra et al.

Oil Absorbency Test of Wetted Organoclay

The modified clays were soaked in water for 12 hours prior to preforming this oil absorption test as described above. The results are as follows.

TABLE III

| Example # | Crude Oil added (g) | Water Surface | Oil Absorption (g/g) |
|---|---|---|---|
| 1 | 2.4 | Clear - no oil film | 0.24 |
| 2 | 3.7 | Clear - no oil film | 0.37 |
| 3 | 2.4 | Clear - no oil film | 0.24 |
| 4 | 2.8 | Clear - no oil film | 0.28 |
| 5 | 3.2 | Clear - no oil film | 0.32 |
| 6 | 4.5 | Clear - no oil film | 0.45 |
| 7 | 3.2 | Clear - no oil film | 0.32 |
| 8 | 3.6 | Clear - no oil film | 0.36 |

These results show that the organoclays retain the oil absorbing properties even after soaking the organoclay with water. This advantage is attributed to the hydrophobicity of the organoclay.

Metals Removal Test

Experiments in metals removal were also conducted. To a 1000 mL beaker, 500 mL of distilled water and approximately 50 ppm of chromium and copper were added as the corresponding salt solutions of $[Cr(H_2O)_4Cl_2]Cl.2H_2O$ and $CuCl_2$. The contaminated water was then mixed with an overhead stirrer. The modified clay was added and allowed to disperse. The mixture was allowed to mix for 24 hours, filtered, and the filtrate water was analyzed by inductively coupled plasma analysis (ICP) for metals. The following table shows the results.

TABLE IV

| Organoclay (Example #) | Cu Init | Cu Aft | Cr Init | Cr Aft | Pb Init | Pb Aft |
|---|---|---|---|---|---|---|
| 9 | 58 | 53 | 53 | 44 | 23 | 19 |
| 10 | 58 | 24 | 53 | 19 | 23 | 6 |
| 11 | 58 | 52 | 53 | 46 | 23 | 13 |
| 5 | 58 | 57 | 53 | 48 | 23 | 19 |
| 6 | 42 | 8 | 42 | 11 | 23 | 6 |

Init = Initial metal concentration in ppm
Aft = Concentration of metal after 24 hour mixing with organoclay, in ppm
Cu = Copper
Cr = Chromium
Pb = Lead The results of Table IV show that the modified organoclays have effectiveness in removing heavy metals from aqueous systems.

All references cited in this specification, including without limitation all papers, patents, patent applications, publications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description shall be interpreted as illustrative and not in a limiting sense.

What is claimed is:

1. A composition for purifying contaminated liquids, the composition comprising a granular microporous non-swelling aluminosilicate substrate comprising particles having a size distribution resulting in 20%–100% by weight retention on a #60 mesh screen having absorbed thereon a primary, secondary or retention alkylamine base.

2. The composition according to claim 1, wherein the composition comprises particles having a size distribution resulting in 80%–100% by weight retention on a #60 mesh screen.

3. The composition according to claim 2, wherein the composition comprises particles having a size distribution resulting in 95%–100% by weight retention on a #60 mesh screen.

4. The composition according to claim 1, wherein the composition comprises particles having a size distribution resulting in at least about 50% by weight retention on a #30 mesh screen.

5. The composition according to claim 1, further comprising a nonionic or cationic surfactant.

6. The composition according to claim 1, wherein the aluminosilicate substrate comprises a needle-shaped crystal structure.

7. The composition according to claim 6, wherein the aluminosilicate substrate comprises a material having a density of about 400 to about 700 kg/m$^3$.

8. The composition according to claim 7, wherein the weight ratio of the alkylamine base to the aluminosilicate substrate on a dry basis is from about 0.1:1 to about 0.6:1.

9. The composition according to claim 1, wherein the aluminosilicate substrate is selected from the group consisting of attapulgite, sepiolite, zeolite and mixtures thereof.

10. The composition according to claim 9, wherein the aluminosilicate substrate comprises more than 80% attapulgite.

11. The composition according to claim 9, wherein the aluminosilicate substrate comprises more than 80% sepiolite.

12. The composition according to claim 9, wherein the aluminosilicate substrate comprises more than 80% zeolite.

13. The composition according to claim 9, wherein the weight ratio of the alkylamine base to the aluminosilicate substrate on a dry basis is from about 0.01:1 to about 2:1.

14. The composition according to claim 13, wherein the weight ratio of the alkylamine base to the aluminosilicate substrate on a dry basis is from about 0.05:1 to about 1:1.

15. The composition according to claim 9, wherein the alkylamine base is non-water soluble.

16. The composition according to claim 15, wherein the alkylamine base comprises a fatty amine.

17. The composition according to claim 16, wherein the alkylamine base comprises a primary fatty amine.

18. The composition according to claim 16, wherein the alkylamine base comprises a primary fatty amine having an alkyl chain of 6–30 carbon atoms.

19. The composition according to claim 18, wherein the alkylamine base comprises a primary fatty amine having an alkyl chain of 10–30 carbon atoms.

20. The composition according to claim 19, wherein the alkylamine base comprises a primary fatty amine having an alkyl chain of 12–30 carbon atoms.

21. The composition according to claim 18, wherein the alkylamine base is selected from the group consisting of oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octacecyldimethylamine, dihydrogenated tallowalkylmethylamine, dioctadecylamine, and mixtures thereof.

22. The composition according to claim 9, wherein the alkylamine base is nonionic and is non-amphoteric.

23. The composition according to claim 9, having a moisture or solvent content of less than about 10% by weight, as determined by weight loss at 100° C. for one hour.

24. The composition according to claim 23, having a moisture or solvent content of less than about 3% by weight, as determined by weight loss at 100° C. for one hour.

25. The composition according to claim 24, having a moisture or solvent content of less than about 1% by weight, as determined by weight loss at 100° C. for one hour.

26. The composition according to claim 9, wherein the composition is more hydrophobic than the aluminosilicate substrate.

27. The composition according to claim 26, that is sufficiently hydrophobic that a layer of the composition resists the absorption of a droplet of water placed thereupon at room temperature for at least about 2 hours.

28. The composition according to claim 27, that is sufficiently hydrophobic that a layer of the composition resists the absorption of a droplet of water placed thereupon at room temperature for at least about 4 hours.

29. The composition according to claim 9, which is capable of absorbing at least about 0.2 g crude oil/g of the dry composition at room temperature.

30. The composition according to claim 29, which is capable of absorbing at least about 0.4 g crude oil/g of the dry composition at room temperature.

31. The composition according to claim 29, which retains at least about 90% of its initial crude oil absorption capacity after being soaked in water for 12 hours at room temperature.

32. The composition according to claim 29, having the alkylamine base distributed throughout the micropores of the aluminosilicate substrate.

33. A method of making a composition for purifying contaminated liquids, the method comprising contacting a granular microporous non-swelling aluminosilicate substrate comprising particles having a size distribution resulting in 20%–100% by weight retention on a #60 mesh screen with a primary, secondary or tertiary alkylamine base so that the alkylamine base is absorbed into the pores of the aluminosilicate substrate.

34. The method according to claim 33, wherein the aluminosilicate substrate has a BET surface area of at least about 100 m$^2$/g and is predominately of the type having needle shaped crystals.

35. The method according to claim 34, wherein the aluminosilicate substrate has a BET surface area of at least about 200 m$^2$/g and has a characteristic pore size of about 6 Å.

36. The method according to claim 33, wherein the aluminosilicate substrate comprises at least about 80% by weight of a material selected from the group consisting of attapulgite, sepiolite and zeolite.

37. The method according to claim 36, wherein the aluminosilicate substrate is in the form of particles and the particles have a particle size distribution resulting in the retention of 80%–100% by weight on a #60 mesh screen.

38. The method according to claim 37, wherein the aluminosilicate substrate is in the form of particles and the particles have a particle size distribution resulting in the retention of 95%–100% by weight on a #60 mesh screen.

39. The method according to claim 36, wherein the aluminosilicate substrate is in the form of particles and the particles have a particle size distribution resulting in the retention of at least about 50% by weight on a #30 mesh screen.

40. The method according to claim 33, wherein the alkylamine base comprises a primary fatty amine having an alkyl chain of 6–30 carbon atoms.

41. The method according to claim 40, wherein the alkylamine base comprises a primary fatty amine having an alkyl chain of 10–30 carbon atoms.

42. The method according to claim 41, wherein the alkylamine base comprises a primary fatty amine having an alkyl chain of 12–30 carbon atoms.

43. The method according to claim 40, wherein the weight ratio of the alkylamine base to the aluminosilicate substrate is from about 0.01:1 to about 2:1.

44. The method according to claim 43, wherein the weight ratio of the alkylamine base to the aluminosilicate substrate is from about 0.05:1 to about 1:1.

45. The method according to claim 44, wherein the weight ratio of the alkylamine base to the aluminosilicate substrate is from about 0.1:1 to about 0.6:1.

46. The method according to claim 33, wherein the alkylamine base is selected from the group consisting of oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octacecyldimethylamine, dihydrogenated tallowalkylmethylamine, dioctadecylamine, and mixtures thereof.

47. The method according to claim 33, wherein the contacting step comprises intermixing the alkylamine with the aluminosilicate substrate, wherein the alkylamine is a liquid mixture.

48. The method according to claim 47, wherein the liquid mixture is at a temperature that is above the melting point of the alkylamine.

49. The method according to claim 48, wherein the aluminosilicate substrate is a regular volatile material (RVM) clay.

50. The method according to claim 49, wherein the aluminosilicate substrate is a low volatile material (LVM) clay.

51. The method according to claim 47, wherein the liquid that is used to form a mixture with the alkylamine is water.

52. The method according to claim 47 wherein the liquid is one in which the alkylamine base is soluble.

53. The method according to claim 47, wherein the liquid is selected from the group consisting of alcohols, halogenated solvents, glycols, ethers, and mixtures thereof.

54. The method according to claim 53, wherein the liquid is selected from the group consisting of isopropanol, dichloromethane, methylene chloride and n-propylbromide.

55. The method according to claim 47, further comprising removing the liquid from the composition.

56. The method according to claim 55, wherein the liquid is removed from the composition by drying at a temperature of from about 20° C. to about 250° C.

57. The method according to claim 56, wherein the liquid is removed from the composition by drying at a temperature of from about 40° C. to about 150° C.

58. The method according to claim 57, wherein the liquid is removed from the composition by drying at a temperature of from about 50° C. to about 100° C.

59. The method according to claim 47, wherein the liquid mixture further comprises a nonionic or cationic surfactant.

60. A method of purifying a contaminated liquid comprising contacting the contaminated liquid with an effective amount of a composition comprising a granular microporous non-swelling aluminosilicate substrate comprising particles having a size distribution resulting in 20%–100% by weight retention on a #60 mesh screen having a primary, secondary or tertiary alkylamine base absorbed thereon.

61. The method according to claim 60, wherein prior to the contacting the composition has been dried to a free moisture or solvent content of below about 10% by weight, as determined by weight loss at 100° C. for one hour.

62. The method according to claim 61, wherein prior to the contacting the composition has been dried to a free moisture or solvent content of below about 1% by weight, as determined by weight loss at 100° C. for one hour.

63. The method according to claim 60, wherein the weight ratio of alkylamine base to aluminosilicate substrate is between 0.01:1 and 2:1.

64. The method according to claim 63, wherein the weight ratio of alkylamine base to aluminosilicate substrate is between 0.1:1 and 0.6:1.

65. The method according to claim 63, wherein the modifier comprises a primary fatty amine.

66. The method according to claim 63, wherein the modifier comprises a primary fatty amine containing an alkyl chain of 6–30 carbon atoms.

67. The method according to claim 66, wherein the modifier is selected from the group consisting of oleyl amine, tallow amine, hydrogenated tallow amine, octylamine, dodecylamine, hexadecylamine, octadecylamine, N-tallowalkyl-1,3-diaminopropane, cocoalkylamine, dihydrogenated tallowalkylamine, trihexadecylamine, octadecyldimethylamine, dihydrogenated tallowalkylmethylamine, dioctadecylamine, and the like.

68. The method according to claim 60, wherein the aluminosilicate substrate comprises more than 80% of a material selected from the group consisting of attapulgite, sepiolite and zeolite.

69. The method according to claim 60, wherein the contaminated liquid is an aqueous system.

70. The method according to claim 69, wherein the contaminated liquid contains toxic, hazardous, or undesirable materials.

71. The method according to claim 70, wherein the contaminated liquid contains contaminants selected from the group consisting of oil, grease, hydrocarbons, pesticides, heavy metals, radioactive waste, colored materials, odor-causing materials, suspended solids, turbidity, haze, paint, solvents, resins, condensate, bilge water, industrial effluent, deinking waste, surfactants, emulsified materials, microorganisms, MTBE, BTEX, BOD, COD, and combinations thereof.

72. The method according to claim 71, wherein the contaminated liquid comprises water containing 1–10,000 ppm of a hydrocarbon.

73. The method according to claim 60, wherein the composition is blended with a solid material selected from the group consisting of attapulgite, sepiolite, bentonite, kaolin, activated carbon, sand, fly ash, an inert mineral, cellulose, zeolite, diatomaceous earth, anthracite, other absorbents and mixtures thereof.

74. The method according to claim 60, wherein the contacting step comprises passing the contaminated liquid through a container of the composition.

75. The method according to claim 60, wherein contacting step comprises adding the composition to the contaminated liquid as a finely divided powder.

76. A method for removing organic impurities from water comprising contacting the water with an effective amount of a composition that is produced by contacting a granular microporous non-swelling aluminosilicate substrate comprising particles having a size distribution resulting in 20%–100% by weight retention on a #60 mesh screen with a primary, secondary or tertiary alkylamine base so that the alkylamine base is absorbed into the pores of the aluminosilicate substrate.

* * * * *

UNITED STATES PATENT AND TRADEMARK OFFICE
CERTIFICATE OF CORRECTION

PATENT NO.    : 6,627,084 B2
DATED         : September 30, 2003
INVENTOR(S)   : Christopher B. Murphy, Jonathan M. Fabri and Robert P. Mahoney It is certified that error appears in the above-identified patent and that said Letters Patent is hereby corrected as shown below:

Column 15,
Line 22, the word "retention", should be replaced with the word -- tertiary --.

Signed and Sealed this

Eleventh Day of November, 2003

JAMES E. ROGAN
*Director of the United States Patent and Trademark Office*